(12) United States Patent
Cai et al.

(10) Patent No.: US 6,353,644 B1
(45) Date of Patent: Mar. 5, 2002

(54) SYSTEM AND METHOD FOR PERFORMING TIME DOMAIN EQUALIZATION

(75) Inventors: Lujing Cai, Tinton Falls; Weimin Liu, Aberdeen; Xiao Liu; Wenye Yang, both of Ocean, all of NJ (US)

(73) Assignee: Globespan, Inc., Red Bank, NJ (US)

( * ) Notice: Subject to any disclaimer, the term of this patent is extended or adjusted under 35 U.S.C. 154(b) by 0 days.

(21) Appl. No.: 09/303,730

(22) Filed: May 3, 1999

Related U.S. Application Data

(60) Provisional application No. 60/085,265, filed on May 13, 1998.

(51) Int. Cl.[7] .................................................. H04B 1/10
(52) U.S. Cl. ........................ 375/350; 708/300; 375/285
(58) Field of Search ................................. 375/222, 229, 375/232, 254, 285, 350, 346, 260, 259; 708/300, 313, 322

(56) References Cited

U.S. PATENT DOCUMENTS 5,495,203 A * 2/1996 Harp et al. .................. 329/306

OTHER PUBLICATIONS

Al–Dhahir, et al., "Optimum Finite–Length Equalization for Multicarrier Transceivers," IEEE Transactions on Communications, vol. 44, No. 1, Jan. 1996, pp. 56–64.

* cited by examiner

Primary Examiner—Jean Corrielus
(74) Attorney, Agent, or Firm—Thomas, Kayden, Horstemeyer & Risley

(57) ABSTRACT

Disclosed is a system and method for signal conditioning and equalization in the time domain, preferably in a discrete multi-tone (DMT) modem. The system preferably includes a processor operating according to operating logic stored on a memory although a dedicated logical circuit may be employed. The operating logic includes logic executing the function of a low pass filter having a predetermined cutoff frequency configured to process a digitized data signal having a first sample rate $f_0$, producing a filtered data signal at a second sample rate $f_1$. The operating logic further includes logic which executes the function of a time domain equalizer, the time domain equalizer being configured to process the filtered signal to shorten the impulse response of the channel while at the same time, the time domain equalizer down-samples the filtered signal from the second sample rate $f_1$, to a third sample rate $f_2$ for further processing in the frequency domain.

13 Claims, 7 Drawing Sheets

SYSTEM AND METHOD FOR PERFORMING TIME DOMAIN EQUALIZATION

CROSS REFERENCE TO RELATED APPLICATIONS

This application claims the benefit of United States provisional patent application entitled "Fractional Spaced Time Domain Equalizer for DMT" filed on May 13, 1998 and afforded Ser. No. 60/085,265.

STATEMENT REGARDING FEDERALLY SPONSORED RESEARCH OR DEVELOPMENT

Not Applicable.

TECHNICAL FIELD

The present invention is generally related to the field of high-speed data communications, and, more particularly, to a system and method for shortening the impulse response of a data communications channel.

BACKGROUND INFORMATION

In data communications using discrete multi-tone (DMT) modulation techniques, equalization and other filtering in the time domain are often employed to reduce or eliminate data signal distortion, intersymbol interference, interchannel interference, and noise introduced by a data communications channel. Since DMT receiving techniques sample and digitize an analog data signal received from a communications channel, an anti-aliasing filter is applied in order to prevent spectral aliasing in the sampled signal.

Anti-aliasing filters can be implemented either entirely in the analog domain, or partially in the analog domain and partially in the digital domain, filtering an over-sampled received signal. Either way, the desired end result is that there be no spectral aliasing when the fast Fourier transform (FFT) is applied to the received signal samples. Conventional DMT techniques sample the received signal at the Nyquist rate, i.e., twice the maximum signal bandwidth, so that each bin at the FFT output corresponds to a data-encoding channel.

However, such anti-aliasing filters, when set to the Nyquist cutoff frequency, introduce either a loss of signal strength, or some spectral aliasing, or both, near the Nyquist frequency, depending upon the exact frequency response of the anti-aliasing filter. The consequence of this loss of signal strength or spectral aliasing is reduced modem performance. Also, such filters feature a sharp cutoff, requiring either an extensive digital filter with a relatively large number of taps, or an extensive analog filter which is employed before digitizing the analog data signal, which increases the cost of the DMT modem. Additionally, such sharp filters may create a substantial time dispersion that further increases the burden of time-domain equalization.

SUMMARY OF THE INVENTION

The present invention entails a system for signal conditioning and equalization in the time domain, preferably in a discrete multi-tone (DMT) modem. The system includes an analog front end, comprising an anti-aliasing filter and an analog-to-digital (A/D) converter operating at a higher-than-Nyquist rate, and a processor operating according to operating logic stored in its memory. The operating logic includes logic executing the function of a low pass filter having a predetermined cutoff frequency configured to process a digitized data signal having a first sample rate $f_0$ received from the A/D converter, producing a filtered data signal at a second sample rate $f_1$. The operating logic further includes logic which executes the function of an adaptive time domain equalizer, the time domain equalizer being configured to process the filtered signal to shorten the impulse response of the channel while at the same time, the time domain equalizer down-samples the filtered signal from the second sample rate $f_1$, to a third sample rate $f_2$ for further processing in the frequency domain.

The present invention provides distinct advantages in that the oversampling feature allows a folding of the power spectral density of the received data signal in a way that enhances the received signal power. In addition, there is no need for an anti-aliasing filter with a sharp cut-off characteristic, that is expensive, difficult to implement, and increases a burden of the equalizer. Rather, a mild low pass filter is employed, requiring fewer taps and, consequently, less computing power and memory.

Alternatively, the mild low-pass filtering function can be implemented in the analog domain, preferably served by the anti-aliasing filter for oversampling. It should be noted that the anti-aliasing filter for an over-sampling equalizer is easier to implement since it does not require a sharp cutoff and its cut-off frequency need not be accurate.

In accordance with another aspect of the present invention, a method is provided for shortening an impulse response of a data communications channel in the time domain in a discrete multi-tone (DMT) modem. The method preferably is applied to a digitized data signal received from a first DMT modem, the digitized data signal having a first sample rate $f_0$. The method comprises the step of digitally attenuating the digitized data signal above a predetermined cutoff frequency, producing a filtered signal at a second sample rate $f_1$. Next the step of processing the filtered signal is performed in a time domain equalizer, in which the filtered signal is down-sampled from the second sample rate $f_1$, to a third sample rate $f_2$, wherein $f_0$ is an integer multiple of $f_1$, and $f_1$, is an integer multiple of $f_2$.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 2B is a functional block diagram of the time domain filtering and equalization function of FIG. 2A;

DETAILED DESCRIPTION OF THE INVENTION

Figure 1A:
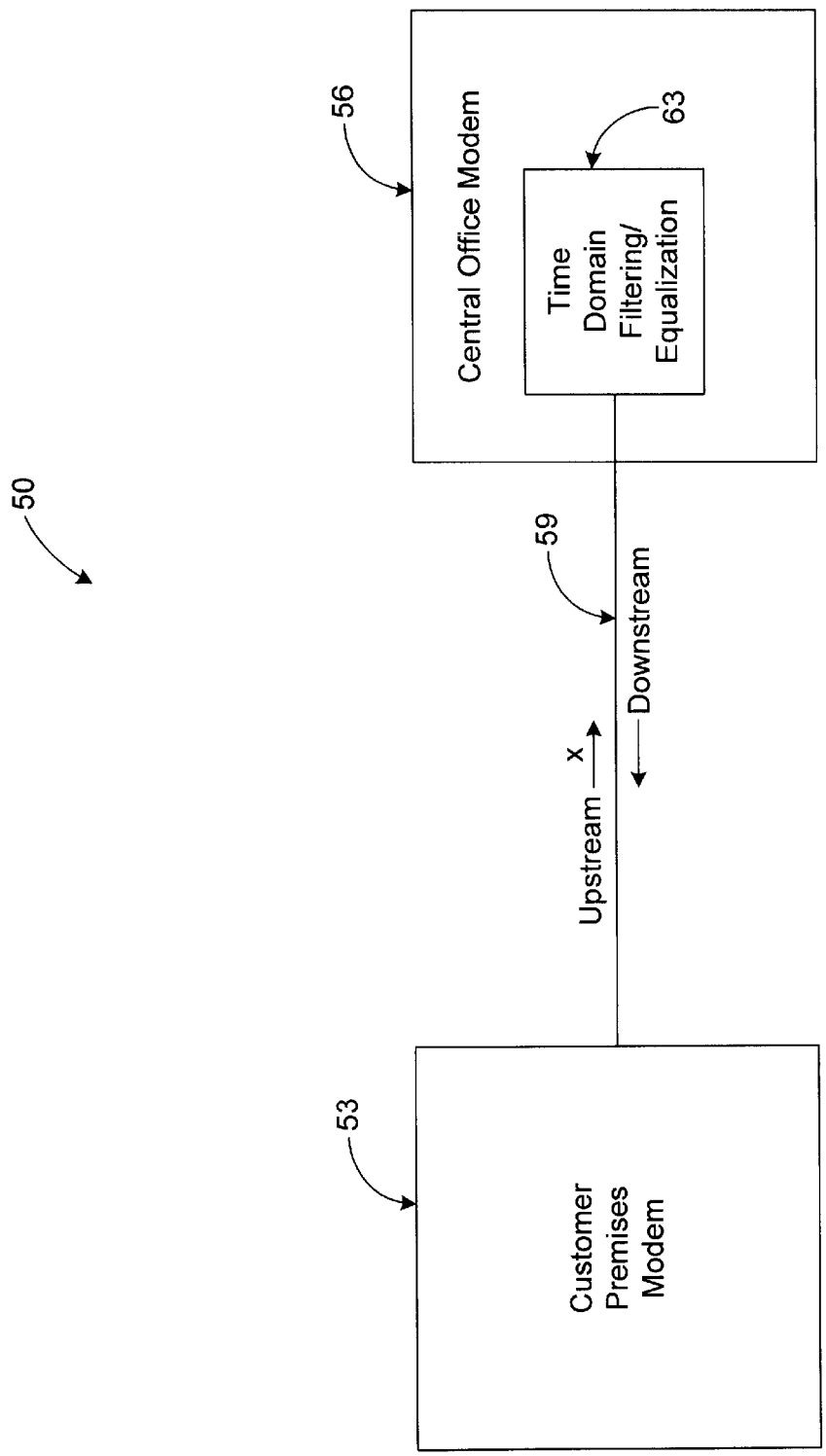
FIG. 1A is a block diagram of a conventional data communications system.

Turning to FIG. 1A, shown is a block diagram of a digital subscriber line communications system 50 in which a customer premises modem 53 is in electrical communication with a central office modem 56 across a communications channel 59. The central office modem 56 includes a time domain filtering and equalization function 63 which is designed to minimize any out-of-band noise and to confine signal distortion created by the channel 59. Both the customer premises modem 53 and the central office modem 56 employ discrete multi-tone (DMT) modulation techniques for high-speed data communication. Also, an analog upstream data signal x is shown as transmitted to the central office modem 56 from the customer premises modem 53, although it is understood that the modems 53 and 56 establish full-duplex, bi-directional data communication.

Figure 1B:
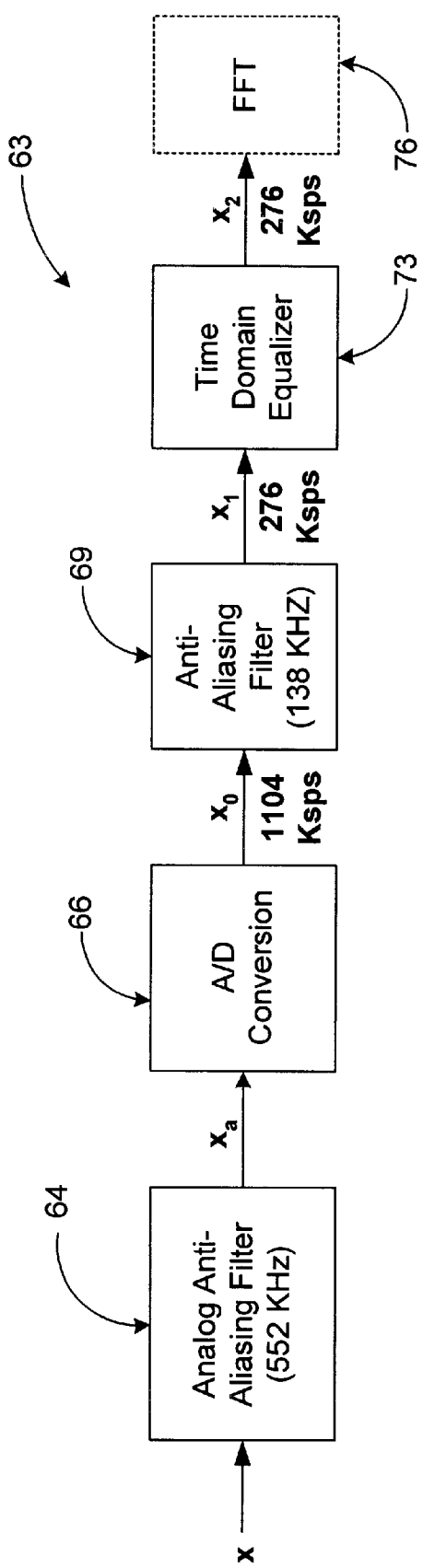
FIG. 1B is a functional block diagram of the conventional time domain filtering and equalization function of FIG. 1A.

Referring next, to FIG. 1B, shown is a functional block diagram of the conventional time domain filtering and equalization function 63. The analog upstream data signal x is fed into an analog anti-aliasing filter 64, resulting in the filtered analog data signal $x_a$ signal. The filtered analog data signal $x_a$ is applied to an analog-to-digital A/D converter 66 that outputs a digital signal $x_0$ with a predetermined sample rate, which is typically a multiple of 276 Kilo-samples-per-second (Ksps). The digital signal $x_0$ is then applied to a digital anti-aliasing filter 69 with a sharp cutoff frequency of 138 Khz, which also decimates its output to 276 Ksps. The output of the anti-aliasing filter $x_1$ is then applied to a time domain equalizer 73 which processes the 276 Ksps signal and confines the distortion created by the channel 59 (FIG. 1A). In particular, the time domain equalizer 73 serves to shorten the composite impulse response of the combination of the channel 59 and all filters in the transmitter of the customer premises modem 53 (FIG. 1A) and in the receiver of the central office modem 56 (FIG. 1A). The digital signal $x_2$ from the time domain equalizer 73 is then applied to a fast Fourier transform (FFT) 76 that reveals the individual sub-channels of the discrete multi-tone signal. Further demodulation and equalization performed in the frequency domain is not discussed herein.

Figure 1C:
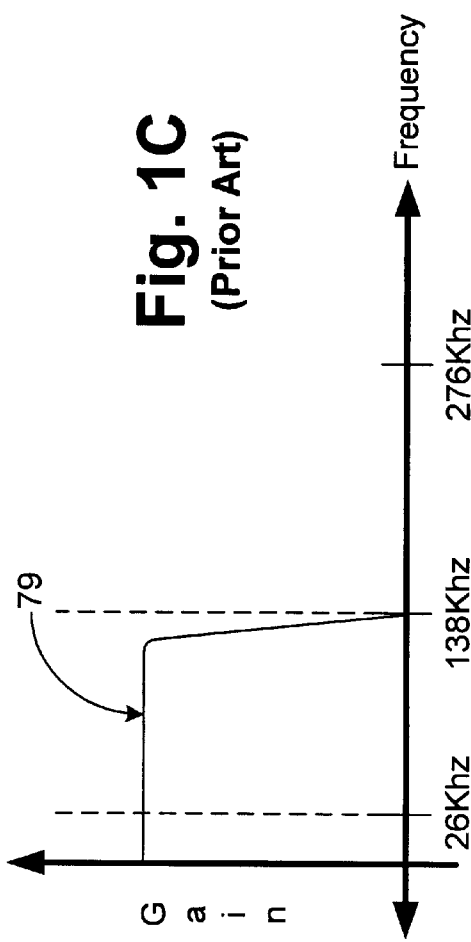
FIG. 1C is a graph of the frequency response of the anti-aliasing filter of FIG. 1B.

Referring next, to FIG. 1C, shown is a graph of the frequency response 79 of the anti-aliasing filter 69. To prevent aliasing at the input of the time domain equalizer 73 (FIG. 1B), a very sharp cutoff is set at 138 Khz to ensure that no frequencies above 138 Khz interfere with those below, as such spectral folding is of uncontrolled phase and may destructively affect the dynamic range of the received signal.

Figure 1D:
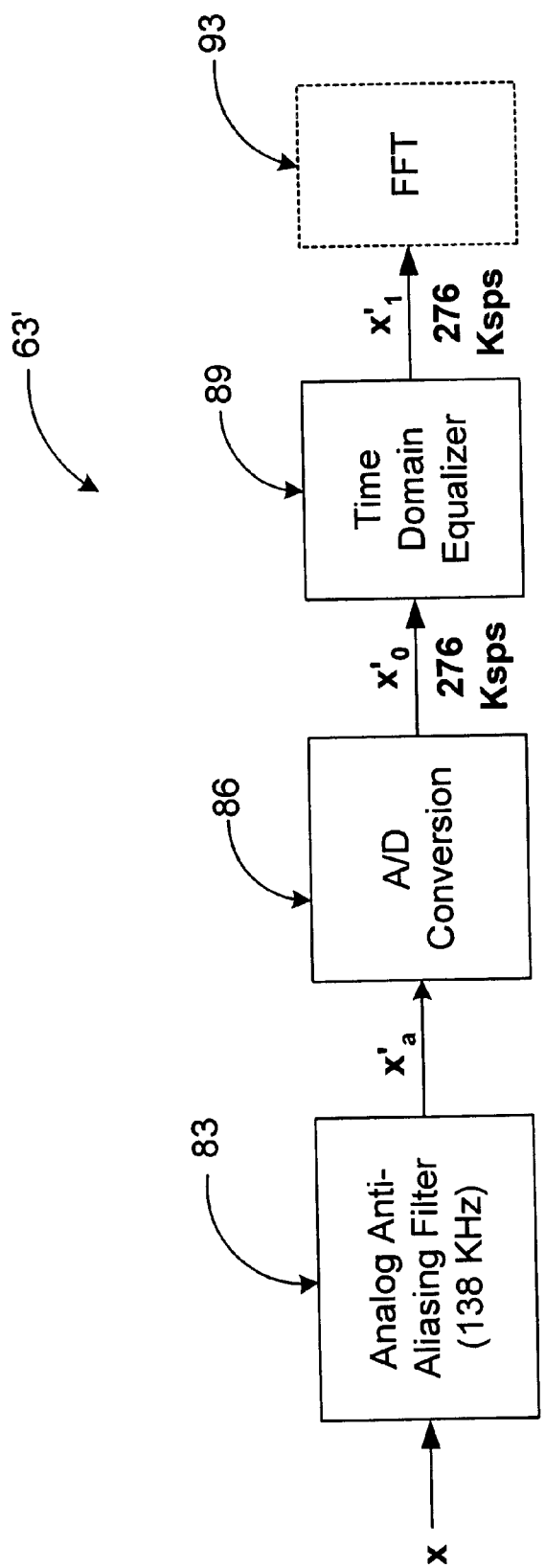
FIG. 1D is a block diagram of a second alternative conventional time domain filtering and equalization function of FIG. 1A.

With reference to FIG. 1D, shown is a functional block diagram of an alternative conventional time domain filtering and equalization function 63'. In this alternative, an analog anti-aliasing filter 83 with a similar sharp cutoff at 138 Khz is used to filter the analog signal x, resulting in the filtered analog signal $x'_a$ which is applied to the A/D converter 86. The output of the A/D converter x'0 is applied to the time domain equalizer 89, resulting in the signal x'1 which is thereafter applied to the FFT 93. As compared with the approach outlined in FIG. 1B, the alternative 63' requires an accurate, sharp analog anti-aliasing filter 83, which is very difficult to implement.

There are significant disadvantages to the use of the digital anti-aliasing filter 69 or the analog anti-aliasing filter 83. In particular, both are difficult and expensive to implement due to their sharp cutoffs. In addition, both filters either attenuate the signal strength, introduce some aliasing, or both, in the useful bandwidth up to 138 Khz which results in reduced signal dynamic range and corresponding diminished performance. Also, due to their sharp cutoff characteristics, both filters have an inevitably long impulse response, which causes more difficulty in time domain equalization since the anti-aliasing filters are part of the signal transmission channel.

Figure 2A:
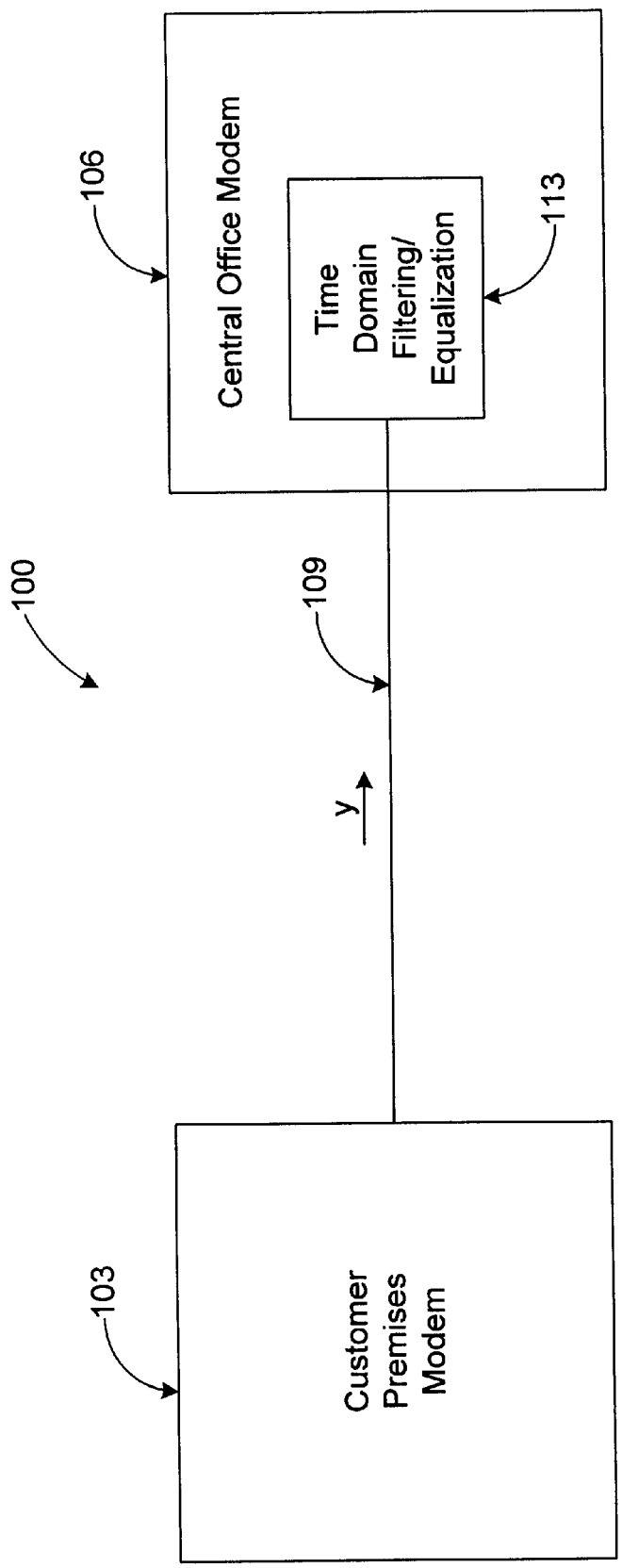
FIG. 2A is a block diagram of a data communications system according to an embodiment of the present invention.

Turning to FIG. 2A, shown is a block diagram of a data communications system 100 according to an embodiment of the present invention. The data communications system 100 includes a customer premises modem 103 in electrical communication with a central office modem 106 across a communications channel 109. The central office modem 106 includes a time domain filtering and equalization function 113 which is designed to minimize any out-of-band noise and confine signal distortion introduced by the channel 109. For purposes of the present discussion, the customer premises modem 103 and the central office modem 106 employ DMT modulation techniques for high- speed data communication, although other modulation techniques may be employed consistent with the invention. Also, an analog upstream data signal y is shown as transmitted to the central office modem 106 from the customer premises modem 103, although it is understood that the modems 103 and 106 establish full-duplex, bi-directional data communication. In addition, the time domain filtering and equalization function 113 is not limited to the central office modem 106, but may be employed in the customer premises modem 103 as well, the placement being in the central office modem 106 to facilitate the present discussion.

Referring next to FIG. 2B, shown is a functional block diagram of a time domain filtering and equalization system 113 according to an embodiment of the present invention. The time domain filtering and equalization system 113 includes a front end analog anti-aliasing filter 114 with a cutoff of, for example, 552 Khz. The output of the analog anti-aliasing filter 113 is a filtered analog data signal $y_a$. The filtered analog data signal $y_a$ is then applied to an A/D converter 116, resulting in a digital signal $y_0$ having a first sampling frequency of $f_0$. The anti-aliasing filter 114 and the A/D converter 116 operate at a higher-than-Nyquist rate. The digital signal $y_0$ is then applied to a digital decimation low pass filter 119 with a gentle roll-off from 138 Khz to 276 Khz and is down-sampled to sampling frequency $f_1$, resulting in a digital signal $y_1$. The digital signal $y_1$ is then applied to a down-sampling time domain equalizer 123 which both performs time domain equalization and down-samples the sample rate of the digital signal $y_1$ to a second frequency $f_2$.

In the preferred embodiment, $f_0$ is an integer multiple of $f_1$, and $f_1$ is an integer multiple of $f_2$. In particular, $f_0$ is equal to, for example, approximately 2,208 Ksps, $f_1$, is approximately equal to 552 Ksps, and $f_2$ is approximately equal to 276 Ksps, although other frequencies may be employed. The output $y_2$ of the down-sampling time domain equalizer 123 is then applied to a fast Fourier transform 126 for further processing in the frequency domain.

The down-sampling time domain equalizer 123 is configured to reduce or eliminate intersymbol interference and distortion introduced by the channel 109. More specifically, the down-sampling time domain equalizer 123 is tuned to "shorten" the impulse response of the channel 109 in that the channel 109 behaves like a short channel which introduces little or no intersymbol interference or distortion after the removal of the cyclic prefix from each DMT symbol in the receiver. The down-sampling time domain equalizer 123 is preferably an adaptive digital filter which includes several coefficients or "taps" which are tuned using a reference signal that is generated during the startup of data communication and periodically adjusted to track slow changes in the channel 109.

Figure 2D:
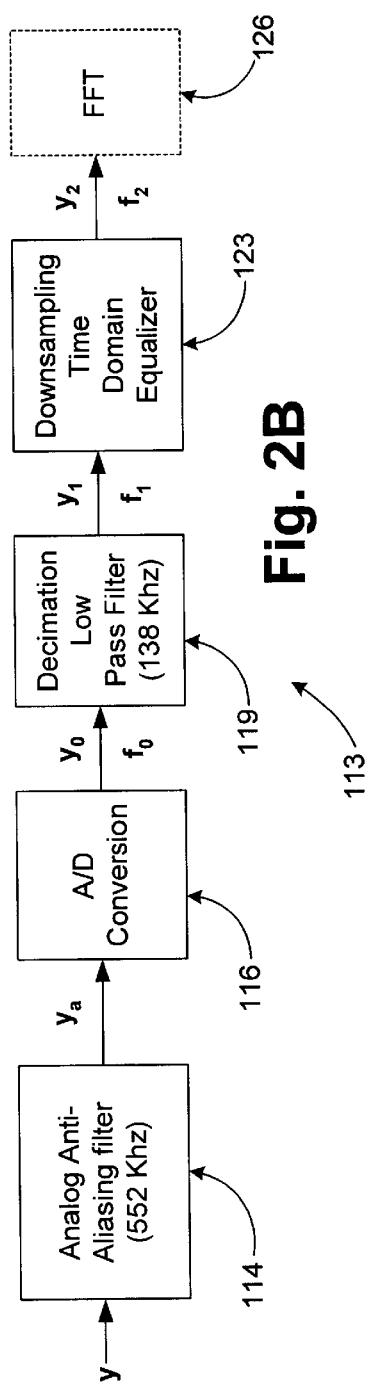
FIG. 2D is a block diagram of the central office modem of FIG. 2A.
Figure 2D:
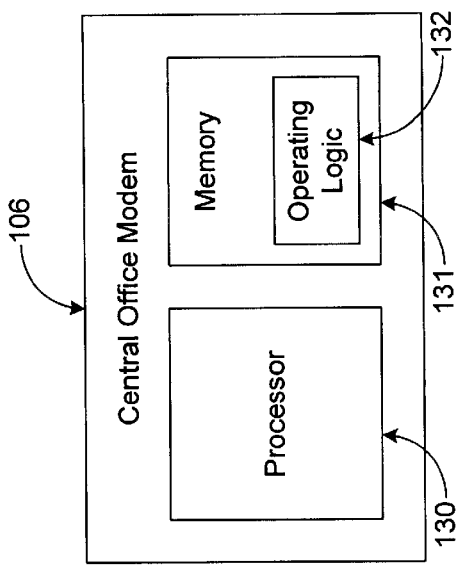
Figure 2C:
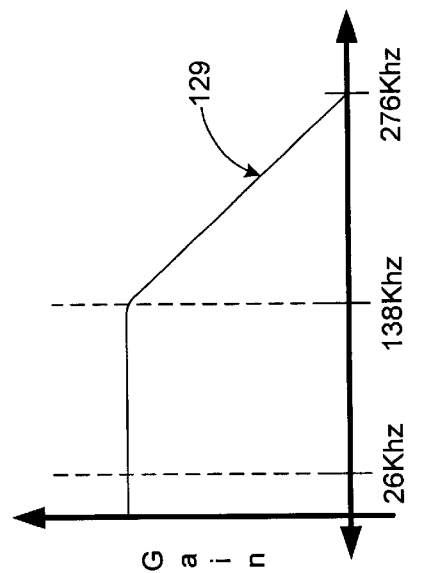
FIG. 2C is a graph of the frequency response of the low pass filter of FIG. 2B.

Turning to FIG. 2C, shown is a graph of the frequency response 129 of the digital decimation low pass filter 119 (FIG. 2B). The filter 119 features a roll-off which begins at 138 Khz and gradually rolls off to maximum attenuation at 276 Khz. Alternatively, an analog low pass filter with a similar frequency response 129 may be used to filter the analog data signal y before the A/D conversion block 116 (FIG. 2B). Due to this gradual cutoff, the low pass filter 119 is less expensive and easier to implement in both the analog and digital domains. In particular, a digital filter with a relatively small number of taps may be employed, reducing the amount of memory space needed to store the filter coefficients. In addition, a short filter in the receive pathway does not burden the time-domain equalizer 123.

Referring to FIG. 2D, shown is a portion of the central office modem 106 which includes a processor 130 with a memory 131. The processor 130 operates according to operating logic 132 stored on the memory 131 which is configured to perform the digital signal processing functions as outlined with reference to FIG. 2B. In particular, the operating logic includes logic to perform the low pass filter 119 and the down-sampling time domain equalizer 123 and other functions. Although the processor 130 and the memory 131 are shown separately, it is possible that the memory 131 be included in the processor circuit. It is understood that the processor 130 and memory 131 employed to perform these functions may be replaced by a dedicated logical circuit, or alternatively, a combination of a processor circuit and assorted dedicated logical circuits may be employed. Note that a front end analog circuit and an A/D converter are preferably employed with the processor circuit to generate the digital signal $y_0$.

Figure 3:
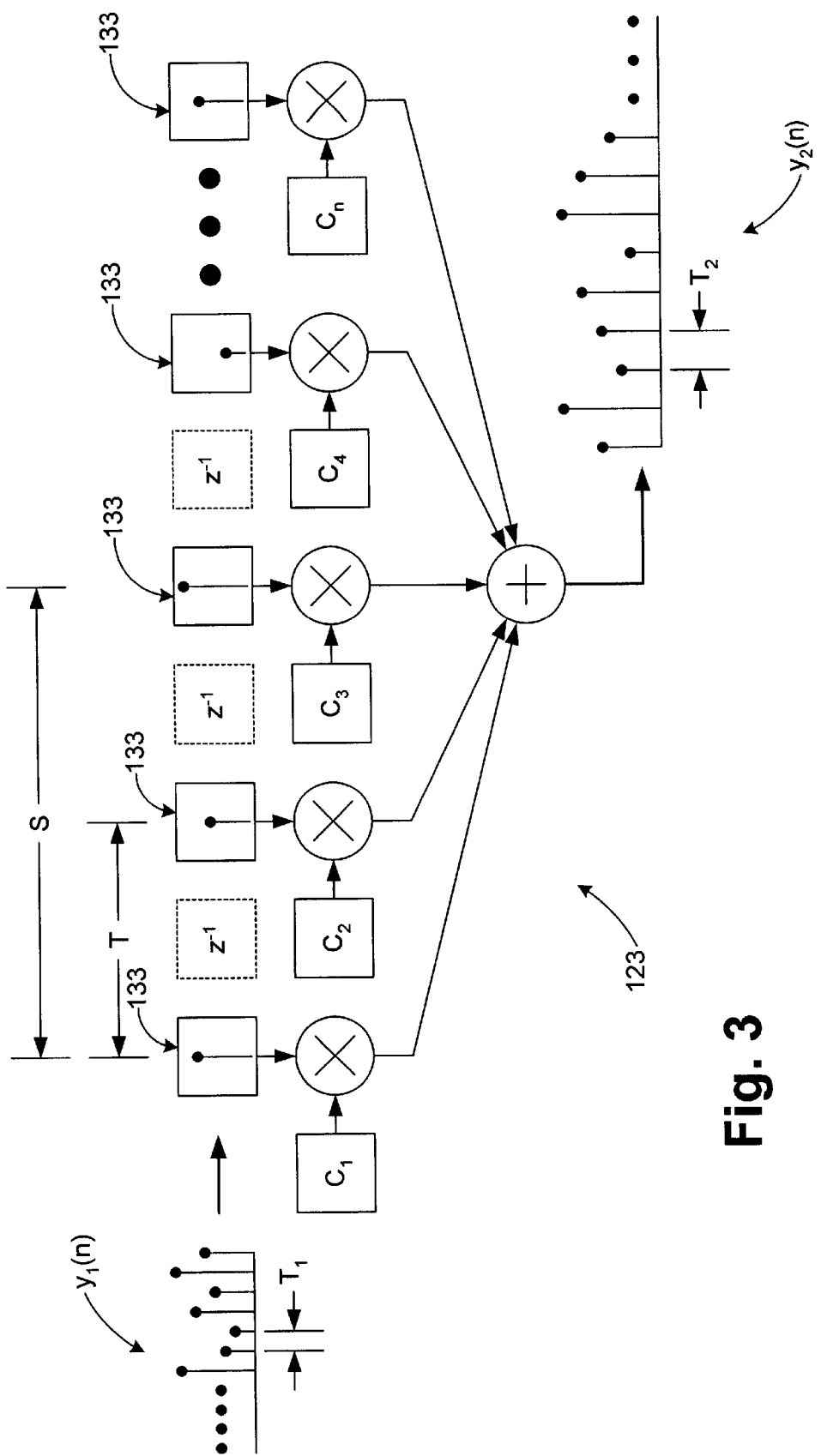
FIG. 3 is a block diagram of the down-sampling time domain equalizer of FIG. 2B.

Turning to FIG. 3, shown is a block diagram of the down-sampling time domain equalizer 123 (FIG. 2B). Note that components of the equalizer 123 used for initial training of the coefficients of the equalizer 123 at the start up of data communication are not shown, as the training principles and procedures are generally known in the art and are not discussed in detail herein.

As shown in FIG. 3, the equalizer 123 is a digital filter that includes a predetermined number n of filter coefficients $C_1$–$C_n$. The samples from the digital signal $y_1(n)$ are shifted into the filter positions 133 of the down-sampling time domain equalizer 123 as shown, producing the equalized digital signal $y_2(n)$. Note that a single delay $z^{-1}$ is placed between each coefficient $C_1$–$C_n$. The ratio of the first and second sample periods $T_1/T_2$ is equivalent to the ratio of the sample rates $f_2/f_1$. According to the preferred embodiment, the ratio of the first sample rate $f_1$, to the second sample rate $f_2$ ($f_1/f_2$) is equal to 2. Thus, the down-sampling time domain equalizer 123 down-samples the input digital signal $y_1(n)$ by a factor of 2. This is accomplished by only calculating a digital signal $y_2(n)$ output for every other digital signal $y_1(n)$ input. Stated differently, the input digital signal $y_1(n)$ is shifted in the filter positions 133 twice for a total shift S between each calculation of the digital signal $y_2(n)$ output.

It is understood that sample rate ratios $f_1/f_2$ other than 2 will require that a different number of samples from the digital signal $y_1(n)$ be shifted into the filter between the calculation of each digital signal $y_2(n)$ output. A time domain equalizer which performs a down-sampling operation as discussed above is referred to herein as a fractional spaced time domain equalizer.

Figure 4A:
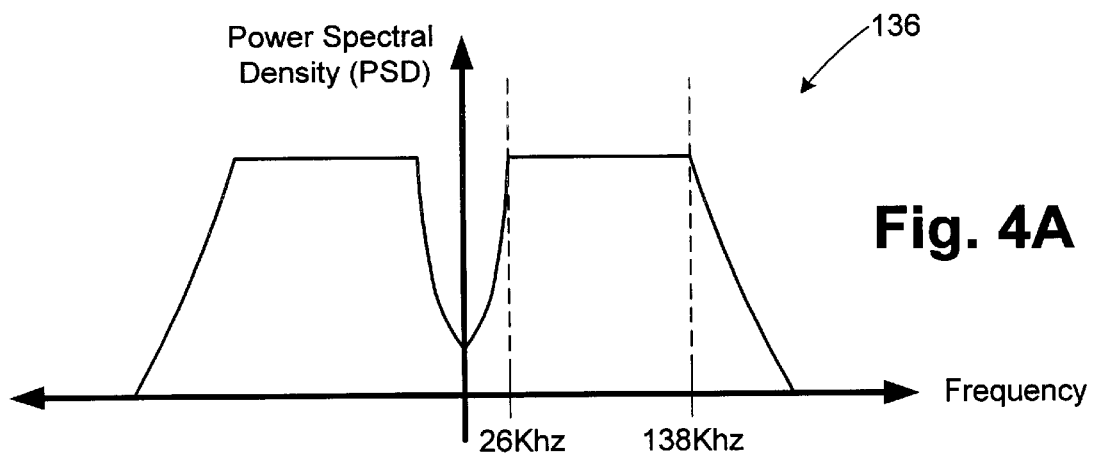
FIG. 4A is a graph of the power spectral density of the transmitted data signal in the data communications system of FIG. 2A.
Figure 4B:
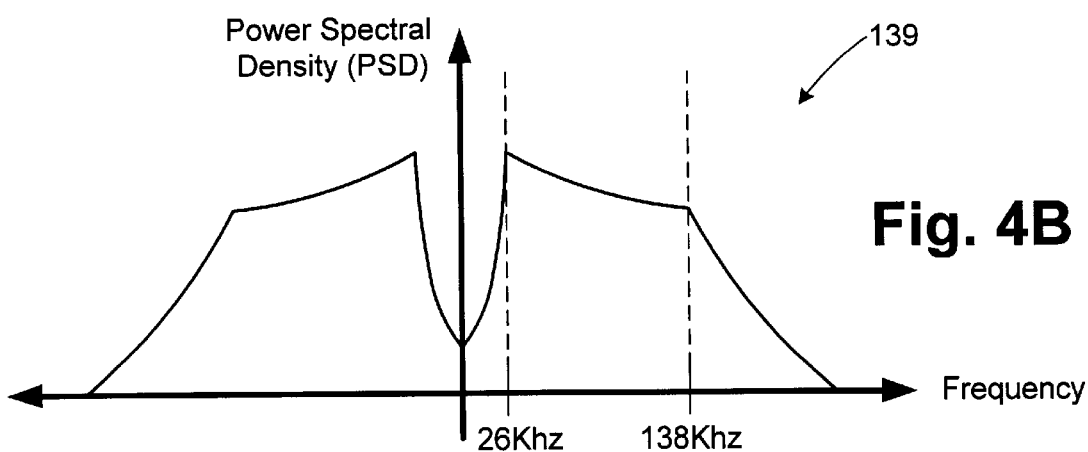
FIG. 4B is a graph of the power spectral density of the received data signal in the data communications system of FIG. 2A.
Figure 4C:
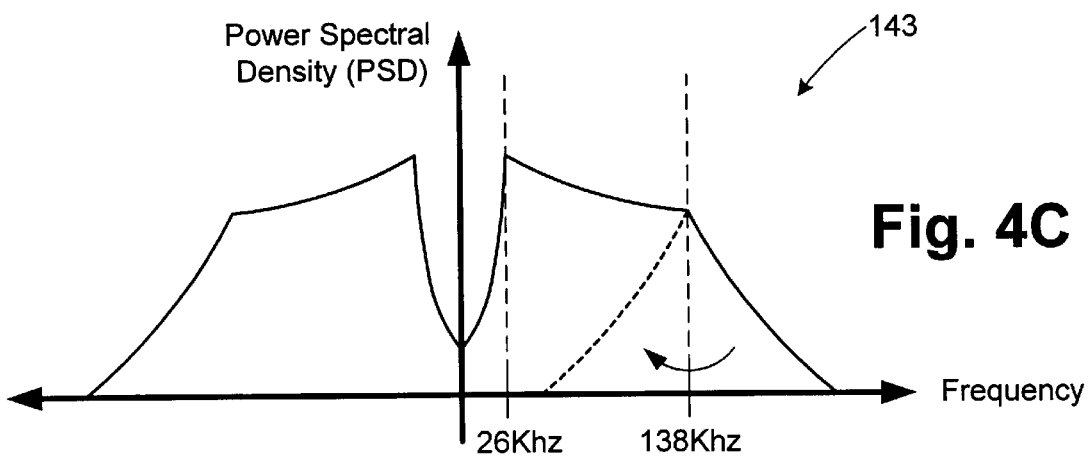
FIG. 4C is a graph showing the folding of the power spectral density of the received data signal of FIG. 4B.

Referring next to FIGS. 4A through 4C, shown is a graph of the transmit power spectral density 136 of the transmitted data signal y from the customer premises modem 103 (FIG. 2A). Note that the transmit power spectral density 136 assumes a down-sampling ratio $f_1:f_2$ of 2:1 as an example for purposes of illustration. The transmit spectrum for the data signal y is chosen to be from 0 to 138 Khz, although other ranges may be used as well. The transmitted data signal y experiences distortion and is subject to noise from the channel 109 (FIG. 2A). The data signal y is received by the central office modem 106 with a receive power spectral density 139. The down-sampling performed by the fractional spaced time domain equalizer 123 causes the spectrum above the 138 Khz frequency to fold over onto itself as illustrated by the folding spectrum 143.

The folding of the power spectral density provides advantages in that the signal power is enhanced in the transmit spectrum. In addition, there is no need for an anti-aliasing filter with a sharp cutoff which is expensive and difficult to implement. Also, there is no loss of data signal strength due to a partial cutoff of the transmit spectrum by an anti-aliasing filter which occurs to achieve a total cutoff at 138 Khz or other cutoff frequency. As a result, the low pass filter 119 (FIG. 2B) is much less expensive and easier to implement, requiring less taps and, consequently, less memory to store coefficients.

Finally, referring back to FIG. 2D, the operating logic 132 or operating program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples of the computer-readable medium would include, but are not limited to, the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in the memory 131.

Many variations and modifications may be made to the preferred embodiment of the invention without departing substantially from the spirit and principles of the invention. All such modications and variations are intended to be included herein within the scope of the present invention as, defined by the following claims.

Having thus described the invention, it is claimed:

1. A system for shortening an impulse response of a data communications channel in the time domain in a discrete multi-tone (DMT) modem, the system configured to operate on a digitized data signal received from a first DMT modem, the digitized data signal having a first sample rate $f_0$, the system comprising:
    a decimation low pass filter having a predetermined cutoff frequency configured to process the digital signal, producing a filtered signal at a second sample rate $f_1$; and
    a time domain equalizer configured to process the filtered signal to shorten the impulse response of the channel, the time domain equalizer down-sampling the filtered signal from the second sample rate $f_1$ to a third sample rate $f_2$.

2. The system of claim 1, wherein $f_0$ is an integer multiple of $f_1$, and $f_1$ is an integer multiple of $f_2$.

3. The system of claim 1, wherein the time domain equalizer further comprises a digital filter having a number of coefficients, the digital filter skipping a number of input samples between a predefined number of output sample calculations.

4. The system of claim 1, wherein $f_1$ is approximately equal to 552 Kilohertz, and $f_2$ is approximately equal to 276 Kilohertz.

5. A system for shortening an impulse response of a data communications channel in the time domain in a discrete multi-tone (DMT) modem, the system configured to operate on a digitized data signal received from a first DMT modem, the digitized data signal having a first sample rate $f_0$, the system comprising:
    a processor having a memory;
    operating logic stored in the memory, the operating logic including:
        logic configured to operate as a low pass filter having a predetermined cutoff frequency to process the data signal, thereby producing a filtered data signal at a second sample rate $f_1$; and
        logic configured to operate as a time domain equalizer, the time domain equalizer being configured to process the filtered signal to shorten the impulse response of the channel, the time domain equalizer down-sampling the filtered signal from the second sample rate $f_1$, to a third sample rate $f_2$.

6. The system of claim 5, wherein $f_0$ is an integer multiple of $f_1$, and $f_1$ is an integer multiple of $f_2$.

7. The system of claim 6, wherein $f_1$, is approximately equal to 552 Kilohertz, and $f_2$ is approximately equal to 276 Kilohertz.

8. A system for shortening an impulse response of a data communications channel in the time domain in a discrete multi-tone (DMT) modem, the system configured to operate on a digitized data signal received from a first DMT modem, the digitized data signal having a first sample rate $f_0$, the system comprising:
    first filtering means for attenuating the digitized data signal above a predetermined cutoff frequency, producing a filtered signal at a second sample rate $f_1$; and
    second filtering means for shortening the impulse response of the channel, the second filtering means down-sampling the filtered signal from the second sample rate $f_1$ to a third sample rate $f_2$.

9. The system of claim 8, wherein $f_0$ is an integer multiple of $f_1$, and $f_1$ is an integer multiple of $f_2$.

10. The system of claim 8, wherein the second filtering means further comprises a digital filter having a number of coefficients, the digital filter skipping a number of input samples between a number of output sample calculations.

11. The system of claim 8, wherein $f_1$ is approximately equal to 552 Kilohertz, and $f_2$ is approximately equal to 276 Kilohertz.

12. A method for shortening an impulse response of a data communications channel in the time domain in a discrete multi-tone (DMT) modem, the method operating on a digitized data signal received from a first DMT modem, the digitized data signal having a first sample rate $f_0$, the method comprising the steps of:
    digitally attenuating the digitized data signal above a predetermined cutoff frequency, producing a filtered signal at a second sample rate $f_1$;
    processing the filtered signal with a time domain equalizer, wherein the filtered signal is down-sampled from the second sample rate $f_1$ to a third sample rate $f_2$, wherein $f_0$ is an integer multiple of $f_1$, and $f_1$ is an integer multiple of $f_2$.

13. A computer readable medium for shortening an impulse response of a data communications channel in the time domain in a discrete multi-tone (DMT) modem, the medium configured to operate on a digitized data signal received from a first DMT modem, the digitized data signal having a first sample rate $f_0$, the medium comprising:
    logic configured to operate as a low pass filter having a predetermined cutoff frequency configured to process the data signal, producing a filtered data signal at a second sample rate $f_1$; and
    logic configured to operate as a time domain equalizer, the time domain equalizer being configured to process the filtered signal to shorten the impulse response of the channel, the time domain equalizer down-sampling the filtered signal from the second sample rate $f_1$ to a third sample rate $f_2$, wherein $f_0$ is an integer multiple of $f_1$, and $f_1$ is an integer multiple of $f_2$.

* * * * *